(12) United States Patent
Carnevali

(10) Patent No.: US 11,320,091 B2
(45) Date of Patent: May 3, 2022

(54) HANDLE WITH MOUNTING TRACK FOR RECEIVING A MOUNT ASSEMBLY

(71) Applicant: National Products, Inc., Seattle, WA (US)

(72) Inventor: Jeffrey D. Carnevali, Seattle, WA (US)

(73) Assignee: National Products, Inc., Seattle, WA (US)

( * ) Notice: Subject to any disclaimer, the term of this patent is extended or adjusted under 35 U.S.C. 154(b) by 0 days.

(21) Appl. No.: 17/233,976

(22) Filed: Apr. 19, 2021

(65) Prior Publication Data

US 2021/0239264 A1  Aug. 5, 2021

Related U.S. Application Data

(63) Continuation of application No. 16/752,243, filed on Jan. 24, 2020, now Pat. No. 10,982,807, which is a continuation-in-part of application No. 16/194,079, filed on Nov. 16, 2018, now Pat. No. 10,941,899, which is a continuation-in-part of application No. 15/612,798, filed on Jun. 2, 2017, now Pat. No. 10,155,306.

(51) Int. Cl.
*F16M 13/02* (2006.01)
*A47G 29/00* (2006.01)
*E05B 1/00* (2006.01)

(52) U.S. Cl.
CPC ........... *F16M 13/022* (2013.01); *A47G 29/00* (2013.01); *E05B 1/0015* (2013.01)

(58) Field of Classification Search
CPC combination set(s) only.
See application file for complete search history.

(56) References Cited

U.S. PATENT DOCUMENTS

| 180,881 | A | 8/1876 | Howson |
| 538,534 | A | 4/1895 | Neill |
| 596,729 | A | 1/1898 | White |
| 842,007 | A | 1/1907 | Parker |
| 855,149 | A | 5/1907 | Vaughn et al. |
| 890,656 | A | 6/1908 | Johnson |

(Continued)

OTHER PUBLICATIONS

Official Communication for U.S. Appl. No. 15/612,764 dated May 30, 2019.

(Continued)

*Primary Examiner* — Monica E Millner
(74) *Attorney, Agent, or Firm* — Branch Partners PLLC; Bruce E. Black

(57) ABSTRACT

A handle with a mounting track includes a handle section. One or more legs extend from the handle section and are attachable to a surface. When the leg is attached to the surface, the handle section forms a graspable handle. A mounting track is formed along at least a portion of the handle section. The mounting track includes a base, two vertical rails extending opposite each other from the base, and two horizontal beams each extending from a different one of the vertical rails over the base toward the other horizontal beam. The horizontal beams are laterally spaced apart from each other by a first distance. The vertical rails and the horizontal beams define a track within which a retention element of a mount assembly can move.

20 Claims, 12 Drawing Sheets

(56) References Cited

U.S. PATENT DOCUMENTS

| | | | |
|---|---|---|---|
| 892,105 A | 6/1908 | White |
| 958,052 A | 5/1910 | Williams |
| 1,009,913 A | 11/1911 | Maguire et al. |
| 1,280,013 A | 9/1918 | Goddard |
| 1,359,645 A | 11/1920 | Zink |
| 1,455,441 A | 5/1923 | Hodny |
| 1,509,068 A | 9/1924 | Herron |
| 1,934,223 A | 11/1933 | Booth |
| 2,029,089 A | 1/1936 | Weirauch |
| 2,114,767 A | 4/1938 | Hodny et al. |
| 2,121,317 A | 6/1938 | Cohen |
| D142,057 S | 8/1945 | Baxter |
| 2,560,556 A | 7/1951 | Creedon |
| 2,650,788 A | 9/1953 | Hulstein |
| 2,688,504 A | 9/1954 | Parker |
| 2,710,609 A | 6/1955 | Giller |
| 2,723,823 A | 11/1955 | Polk |
| 2,752,173 A | 6/1956 | Krooss |
| 2,859,710 A | 11/1958 | Elsner |
| 2,861,501 A | 11/1958 | Strelakos |
| 3,096,061 A | 7/1963 | Bertell |
| 3,252,677 A | 5/1966 | Raymond |
| 3,304,038 A | 2/1967 | Guthrie |
| 3,605,637 A | 9/1971 | Prete, Jr. |
| 3,652,050 A | 3/1972 | Marrujo et al. |
| 3,779,502 A | 12/1973 | Marberg |
| 3,843,272 A | 10/1974 | Jorn |
| 4,060,241 A | 11/1977 | Hegel |
| 4,060,331 A | 11/1977 | Domer et al. |
| 4,066,231 A | 1/1978 | Bahner |
| 4,066,311 A | 1/1978 | Poulson |
| D247,420 S | 3/1978 | Reynolds |
| 4,085,684 A | 4/1978 | McLennan et al. |
| 4,183,387 A | 1/1980 | Lenz |
| 4,205,486 A | 6/1980 | Guamacci |
| 4,222,680 A | 9/1980 | Browning |
| 4,225,258 A | 9/1980 | Thompson |
| 4,307,864 A | 12/1981 | Benoit |
| 4,461,284 A | 7/1984 | Fackler |
| 4,491,435 A | 1/1985 | Meier |
| 4,585,197 A | 4/1986 | Liautaud et al. |
| 4,611,839 A | 9/1986 | Rung et al. |
| 4,620,813 A | 11/1986 | Lacher |
| 4,641,986 A | 2/1987 | Tsui et al. |
| 4,677,794 A | 7/1987 | Parron et al. |
| 4,688,843 A | 8/1987 | Hall |
| 4,796,508 A | 1/1989 | Hoshino |
| 4,800,795 A | 1/1989 | Yamashita |
| 4,805,784 A | 2/1989 | Solheim et al. |
| 4,842,308 A | 6/1989 | Spotts |
| 4,872,630 A | 10/1989 | Cooper |
| 4,950,099 A | 8/1990 | Roellin |
| 5,071,279 A | 12/1991 | Rustrom |
| 5,092,551 A | 3/1992 | Meier |
| 5,109,321 A | 4/1992 | Maglica et al. |
| 5,118,058 A | 6/1992 | Richter |
| 5,241,796 A | 9/1993 | Hellwig et al. |
| 5,251,859 A | 10/1993 | Cyrell et al. |
| 5,259,711 A | 11/1993 | Beck |
| 5,270,911 A | 12/1993 | Maglica et al. |
| 5,284,098 A | 2/1994 | Klapperich et al. |
| 5,305,700 A | 4/1994 | Strong et al. |
| 5,419,522 A | 5/1995 | Luecke et al. |
| 5,441,225 A | 8/1995 | Hall |
| 5,564,668 A | 10/1996 | Crowe, II |
| 5,628,597 A | 5/1997 | Chudoba et al. |
| 5,727,858 A | 3/1998 | Shapiro |
| 5,823,724 A | 10/1998 | Lee |
| 5,845,885 A | 12/1998 | Carnevali |
| 6,173,926 B1 | 1/2001 | Elvegaard |
| 6,308,642 B1 | 10/2001 | Branam et al. |
| 6,561,476 B2 | 5/2003 | Carnevali |
| 6,581,892 B2 | 6/2003 | Carnevali |
| 6,588,722 B2 | 7/2003 | Eguchi et al. |
| 6,644,901 B2 * | 11/2003 | Breckel ............... B60P 7/0815 |
| | | | 410/104 |
| 6,666,420 B1 | 12/2003 | Carnevali |
| 6,688,568 B1 | 2/2004 | Moufflet |
| 6,695,183 B2 | 2/2004 | Hancock et al. |
| 6,789,988 B1 | 9/2004 | Moradians |
| 6,846,140 B2 | 1/2005 | Anderson et al. |
| 6,902,089 B2 | 6/2005 | Carnevali |
| 6,945,414 B1 | 9/2005 | Stevens et al. |
| 7,090,181 B2 | 8/2006 | Biba et al. |
| 7,100,808 B2 | 9/2006 | Hancock et al. |
| 7,159,998 B2 | 1/2007 | Moreland |
| D539,639 S | 4/2007 | Nagle |
| 7,277,240 B2 | 10/2007 | Carnevali |
| 7,320,450 B2 | 1/2008 | Carnevali |
| D563,781 S | 3/2008 | Carnevali |
| D564,062 S | 3/2008 | Carnevali |
| 7,337,934 B2 | 3/2008 | Alling et al. |
| 7,401,995 B2 | 7/2008 | Senakiewich, II |
| 7,422,184 B2 | 9/2008 | Carnevali |
| D588,903 S | 3/2009 | Carnevali |
| D589,327 S | 3/2009 | Carnevali |
| D590,696 S | 4/2009 | Carnevali |
| 7,517,181 B2 * | 4/2009 | Dunaway ............... G09F 3/0305 |
| | | | 410/104 |
| 7,523,904 B2 | 4/2009 | Carnevali |
| 7,551,458 B2 | 6/2009 | Carnevali |
| 7,556,463 B1 | 7/2009 | Hall |
| 7,571,522 B2 | 8/2009 | Carnevali |
| 7,607,622 B2 | 10/2009 | Carnevali |
| 7,682,543 B2 | 3/2010 | Carnevali |
| 7,731,140 B2 | 6/2010 | Carnevali |
| 7,774,973 B2 | 8/2010 | Carnevali |
| D629,080 S | 12/2010 | Dole et al. |
| 7,849,630 B2 | 12/2010 | Carnevali |
| 7,850,133 B2 | 12/2010 | Carnevali |
| 7,854,204 B2 | 12/2010 | Dacus |
| RE42,060 E | 1/2011 | Carnevali |
| 7,874,774 B2 * | 1/2011 | Peterson ............... B60P 7/0815 |
| | | | 410/104 |
| 7,887,018 B2 | 2/2011 | Carnevali |
| 7,950,701 B2 | 5/2011 | Dole et al. |
| 7,954,773 B2 | 6/2011 | Carnevali |
| 7,975,971 B2 | 7/2011 | Carnevali |
| 7,980,614 B2 * | 7/2011 | Denton ............... B60R 7/04 |
| | | | 296/24.3 |
| 7,980,798 B1 | 7/2011 | Kuehn et al. |
| RE42,581 E | 8/2011 | Carnevali |
| 7,988,106 B2 | 8/2011 | Carnevali |
| 8,020,828 B2 | 9/2011 | Carnevali |
| 8,037,904 B2 | 10/2011 | Carnevali |
| 8,156,681 B2 | 4/2012 | Carnevali |
| 8,201,788 B2 | 6/2012 | Carnevali |
| 8,235,340 B2 | 8/2012 | Carnevali |
| RE43,806 E | 11/2012 | Carnevali |
| 8,322,955 B2 | 12/2012 | Arnesen et al. |
| 8,408,853 B2 | 4/2013 | Womack et al. |
| 8,454,178 B2 | 6/2013 | Carnevali |
| 8,505,861 B2 | 8/2013 | Carnevali |
| 8,534,519 B2 | 9/2013 | Hancock et al. |
| 8,590,855 B2 | 11/2013 | Carnevali |
| 8,651,289 B2 | 2/2014 | Diaz, Jr. et al. |
| 8,776,698 B2 | 7/2014 | Pherson |
| 8,992,238 B2 | 3/2015 | Chinn |
| 9,056,580 B2 | 6/2015 | Baldsiefen et al. |
| 9,180,925 B2 | 11/2015 | Carnevali |
| 9,253,970 B2 | 2/2016 | Carnevali |
| 9,365,150 B2 | 6/2016 | Baldsiefen et al. |
| 9,379,504 B2 | 6/2016 | Chinn |
| 9,623,787 B2 | 4/2017 | Sterling |
| 9,671,060 B1 | 6/2017 | Cifers |
| 9,828,073 B1 | 11/2017 | Cifers, III |
| 9,944,217 B2 | 4/2018 | Schroeder et al. |
| 9,975,466 B2 | 5/2018 | Hendren et al. |
| 9,987,993 B2 | 6/2018 | Thorimbert |
| 10,155,306 B1 | 12/2018 | Carnevali |
| 10,378,690 B2 | 8/2019 | Carnevali |
| 10,429,002 B2 | 10/2019 | Carnevali |
| 10,448,626 B2 | 10/2019 | Carnevali |

(56) References Cited

U.S. PATENT DOCUMENTS

| | | | |
|---|---|---|---|
| 10,527,219 B2 | 1/2020 | Carnevali | |
| 10,982,807 B2 * | 4/2021 | Carnevali | A47B 95/02 |
| 2003/0042282 A1 | 3/2003 | Gates et al. | |
| 2003/0185008 A1 | 10/2003 | Moreland | |
| 2004/0178309 A1 | 9/2004 | Crowley et al. | |
| 2005/0036848 A1 | 2/2005 | Cunningham et al. | |
| 2005/0092876 A1 | 5/2005 | Carnevali | |
| 2005/0132937 A1 | 6/2005 | Branam | |
| 2006/0000957 A1 | 1/2006 | Carnevali | |
| 2006/0102823 A1 | 5/2006 | Carnevali | |
| 2008/0115344 A1 | 5/2008 | Carnevali | |
| 2008/0296334 A1 | 12/2008 | Carnevali | |
| 2009/0014584 A1 | 1/2009 | Ruddock et al. | |
| 2009/0095206 A1 | 4/2009 | Dacus | |
| 2009/0108151 A1 | 4/2009 | Carnevali | |
| 2009/0108152 A1 | 4/2009 | Carnevali | |
| 2009/0140112 A1 | 6/2009 | Carnevali | |
| 2009/0241293 A1 | 10/2009 | Swerdlick | |
| 2010/0282802 A1 | 11/2010 | Carnevali | |
| 2010/0284199 A1 | 11/2010 | Carnevali | |
| 2010/0288843 A1 | 11/2010 | Arnesen et al. | |
| 2011/0097177 A1 | 4/2011 | Carnevali | |
| 2012/0006948 A1 | 1/2012 | Hiss et al. | |
| 2012/0181409 A1 * | 7/2012 | Hayahara | B60P 7/0815 248/429 |
| 2012/0217353 A1 | 8/2012 | Hennon | |
| 2012/0318937 A1 | 12/2012 | Carnevali | |
| 2013/0133158 A1 | 5/2013 | Tran | |
| 2014/0003878 A1 | 1/2014 | Knox et al. | |
| 2014/0034794 A1 | 2/2014 | Carnevali | |
| 2014/0226315 A1 | 8/2014 | Nicieja et al. | |
| 2014/0248103 A1 | 9/2014 | Baldsiefen et al. | |
| 2015/0030386 A1 | 1/2015 | Carnevali | |
| 2015/0275942 A1 | 10/2015 | Carnevali | |
| 2016/0288691 A1 | 10/2016 | Aubrey et al. | |
| 2017/0209318 A1 | 7/2017 | Schroeder et al. | |

OTHER PUBLICATIONS

Official Communication for U.S. Appl. No. 15/612,764 dated Nov. 14, 2018.
Official Communication for U.S. Appl. No. 15/612,798 dated May 16, 2018.
Official Communication for U.S. Appl. No. 16/752,243 dated Jul. 7, 2020.
Official Communication for U.S. Appl. No. 16/752,243 dated Oct. 20, 2020.
Yakattack.us, 4 pages of product description of GTTL retrieved from web site at: www.yakattack.us/geartrac/gttl/.
Yakattack.us, 6 pages of product description of GTSL90 retrieved from web site at: www.yakattack.us/by-product-name/geartrac/gtsl90/.
Yakattack.us, 5 pages of product description of GT90 retrieved from web site at: www.yakattack.us/geartrac/gt90/.
Yakattack.us, 4 pages of product description of GT175 retrieved from web site at: www.yakattack.us/geartrac/gt175/.
Yakattack.us, 7 pages of product description of GearTrac retrieved from web site at: www.yakattack.us/by-product-name/geartrac/.

* cited by examiner

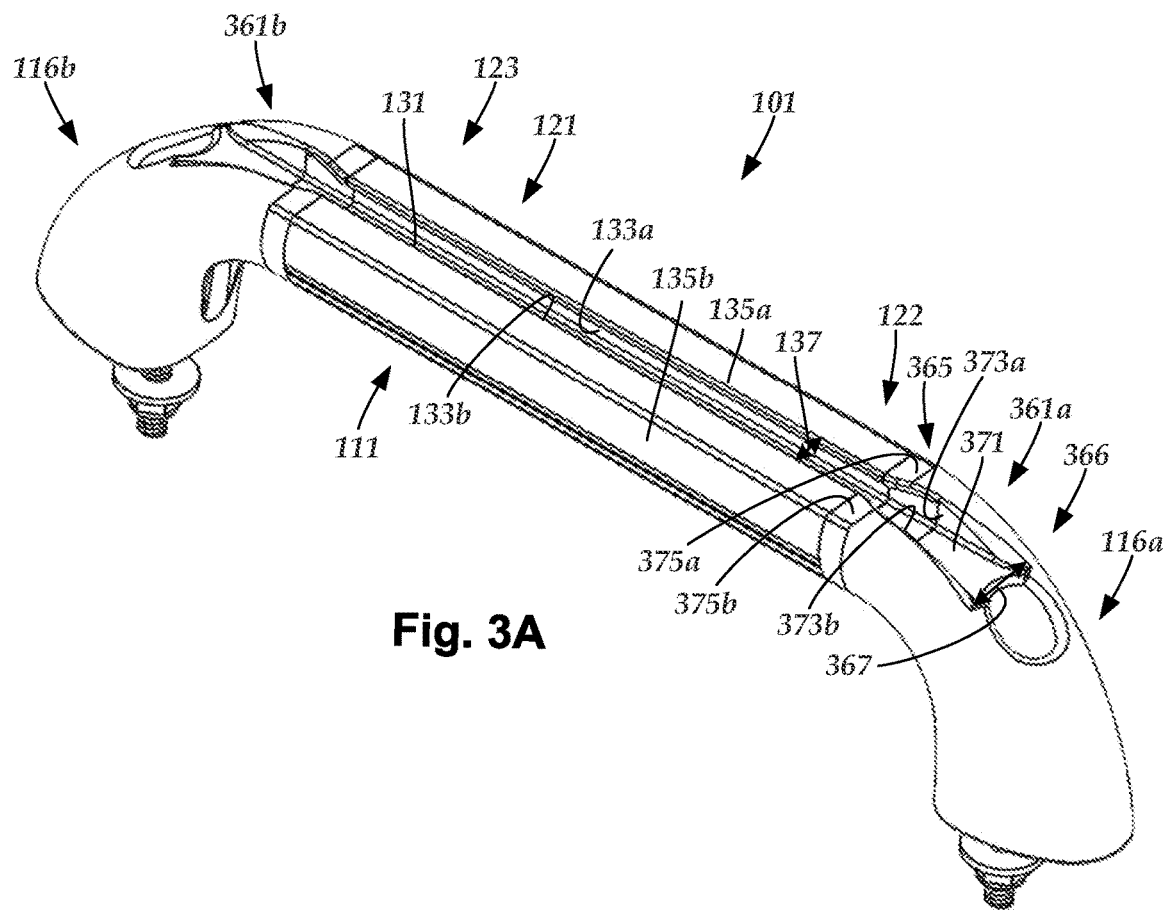
Fig. 3A
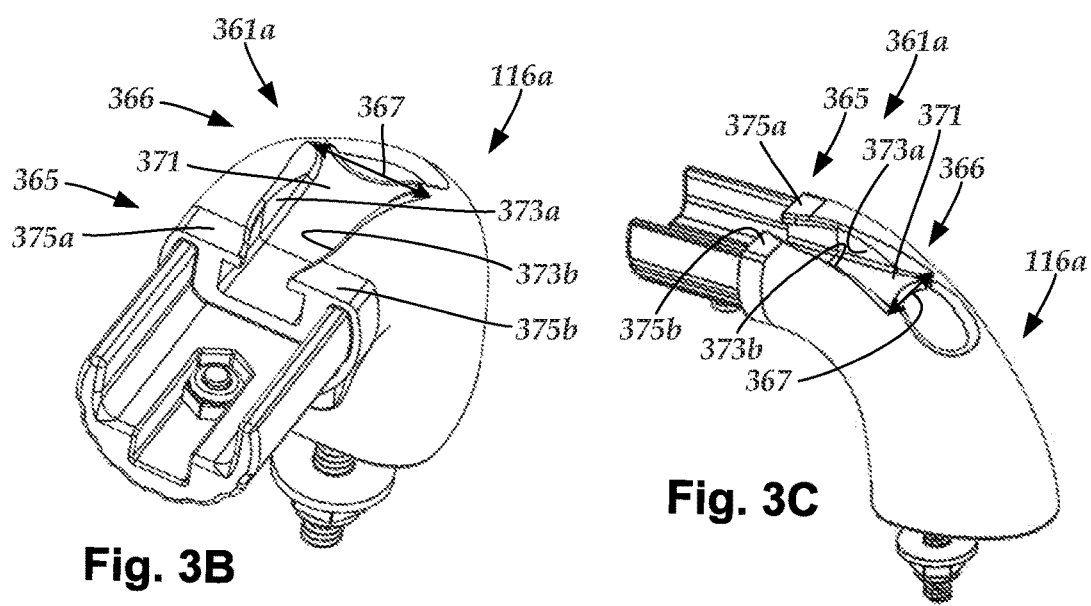
Fig. 3B
Fig. 3C

HANDLE WITH MOUNTING TRACK FOR RECEIVING A MOUNT ASSEMBLY

CROSS-REFERENCE TO RELATED APPLICATIONS

This patent application is a continuation of U.S. patent application Ser. No. 16/752,243, filed Jan. 24, 2020, which issued as U.S. Pat. No. 10,982,807, which is a continuation-in-part of U.S. patent application Ser. No. 16/194,079, filed Nov. 16, 2018, which issued as U.S. Pat. No. 10,941,899, which is a continuation-in-part of U.S. patent application Ser. No. 15/612,798, filed Jun. 2, 2017, which issued as U.S. Pat. No. 10,155,306, all of which are incorporated herein by reference.

FIELD

The present invention is directed to the area of mounting track systems. The present invention is also directed to a handle that is attachable to a surface and that includes a mounting track configured for receiving a mount assembly.

BACKGROUND

Providing mounts for holding, retaining, or securing objects has proven beneficial for many different uses. Some mountable-objects, such as electronic devices (e.g., phones, laptops, tablets, visual-enhancement devices, positioning devices, or the like), are increasingly used in situations where mounting the object to a surface increases the convenience of using the object. For example, in the case of hand-held devices, mounts eliminate the need to hold the device, or prop the device up, in order to use the device, thereby allowing a user to use the device, while simultaneously engaging in other activities which may benefit from the use of both hands without the encumberment of holding or propping-up the device. In some instances, mounting the device may increase user safety by enabling use of the device, without the distraction of holding the device.

Track systems enable an object to be held, retained, or secured, while also enabling limited movement of the object along a fixed path, or track. Attaching track systems to a surface provides a way to mount an object to the surface while also allowing flexibility of positioning of the object along portions of the surface along which the track system extends. Handles have many uses, including facilitating grasping, lifting, or carrying an object.

BRIEF SUMMARY

In one embodiment, a handle with a mounting track includes a handle section. One or more legs extend from the handle section and are attachable to a surface. When the leg is attached to the surface, the handle section forms a graspable handle. A mounting track is formed along at least a portion of the handle section. The mounting track includes a base, two vertical rails extending opposite each other from the base, and two horizontal beams. Each of the horizontal beams extends from a different one of the vertical rails over the base toward the other horizontal beam. The horizontal beams are laterally spaced apart from each other by a first distance. The vertical rails and the horizontal beams define a track within which a retention element of a mount assembly can move.

In at least some embodiments, each of two opposing ends of the track is open to permit insertion of the retention element of the mount assembly into the track. In at least some embodiments, each of two opposing ends of the track is closed. In at least some embodiments, one of two opposing ends of the track is open to permit insertion of the retention element of the mount assembly into the track and the other of the two opposing ends is closed.

In at least some embodiments, the handle section includes a gripping surface extending beneath the mounting track and coupling together the two horizontal beams of the mounting track.

In at least some embodiments, the handle section has a first end and an opposing second end, and where the at least one leg includes a first leg coupled to the first end of the handle section and a second leg coupled to the second end of the handle section. In at least some embodiments, a third leg is coupled to the handle section.

In at least some embodiments, the handle section is detachable from the at least one leg. In at least some embodiments, the at least one leg defines at least one surface-fastening aperture configured and arranged for receiving a fastener for fastening the at least one leg to a surface.

In at least some embodiments, the at least one open end of the track comprises an insertion zone for facilitating insertion of the retention element of the mount assembly into the track. The insertion zone includes an insertion-zone base having a first end and an opposing second end. At least one of the first end or the second end couples to the track. Two vertical insertion-zone rails extend opposite each other from the insertion-zone base. The insertion zone further includes two horizontal insertion-zone beams, where each of the horizontal insertion-zone beams extends from a different one of the vertical insertion-zone rails over the insertion-zone base toward the other horizontal insertion-zone beam. At least two opposing portions of the two horizontal endpiece beams are spaced apart from each other by a second distance that is at least 10% larger than the first distance to facilitate insertion of the retention element of the mount assembly into the track.

In at least some embodiments, one of two opposing ends of the track is open, and the insertion zone is disposed along the open end of the track. In at least some embodiments, the insertion zone is disposed along an insertion-piece positioned along an intermediate portion of the track. In at least some embodiments, the insertion zone is disposed along an endpiece positioned along an end of the track and forming a closed end of the track. In at least some embodiments, the insertion zone is at least partially disposed along the at least one leg.

In another embodiment, a track-mounting system includes the handle described above and a mount assembly coupleable to the track of the handle. The mount assembly includes a mount coupled to a retention element having a smallest lateral dimension that is greater than the first distance and at least one lateral dimension that is less than the second distance. The retention element is configured and arranged for insertion into the mounting track along the insertion zone and sliding along the track to position the mount at a mounting location along the track. In at least some embodiments, the retention element is a T-bolt or a T-nut. In at least some embodiments, the mount is at least one of a ball or a cleat.

In yet another embodiment, a method of coupling a mount assembly to a handle includes providing the handle described above; inserting a retention element of a mount assembly into the mounting track of the handle; and sliding the mount assembly along the mounting track to a mounting location. In at least some embodiments, inserting a retention element of a mount assembly into the mounting track includes inserting the retention element into an insertion zone and sliding the mount assembly onto the handle section of the handle. In at least some embodiments, the above described method further includes fastening the at least one leg of the handle to a surface.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 3A is a schematic perspective view of one embodiment of the handle of FIG. 1, the handle including insertion zones disposed along ends of the mounting track, the insertion zones configured for facilitating insertion of a retention element of a mount assembly into the mounting track, according to the invention;

FIG. 3B is a schematic first perspective view of one embodiment of a leg of the handle of FIG. 3A detached from the handle section, the leg including an insertion zone, according to the invention;

FIG. 3C is a schematic second perspective view of one embodiment of the leg of FIG. 3B, according to the invention;

DETAILED DESCRIPTION

The present invention is directed to the area of mounting track systems. The present invention is also directed to a handle that is attachable to a surface and that includes a mounting track configured for receiving a mount assembly.

A handle includes a mounting track for receiving a retention element of a mount assembly. When the retention element of the mount assembly is received by the mounting track, movement of the mount assembly is restricted to positions along a length of the track. One or more legs of the handle can be used to attach the handle to a surface (e.g., a vehicle surface, a dock, a countertop, a cabinet, a table, a floor, a wall, a ceiling, a ledge, or the like). When the one or more legs of the handle are attached to a surface, the handle forms a graspable handle.

The mounting track can be used to receive any suitable type of mount (e.g., a ball mount, a cleat, or the like or combinations thereof). The mounting track can be used to concurrently or sequentially receive any suitable number of mount assemblies (e.g., one, two three, four, five, six, seven, eight, nine, ten, twenty, or more mount assemblies).

Received mounts can be used to hold, retain, or secure any suitable type of object. In some embodiments, a received mount is coupleable to a docking feature for docking with an object, such as an electronic device. In some embodiments, a received mount is coupleable to an additional mount that facilitates docking of an object. In some embodiments, the mount can be used to secure the substrate to which it is attached to another object. In some embodiments, the mount includes one or more guide features to enable the mount to be retained in the mounting track in a particular orientation relative to the mounting track.

Figure 1:
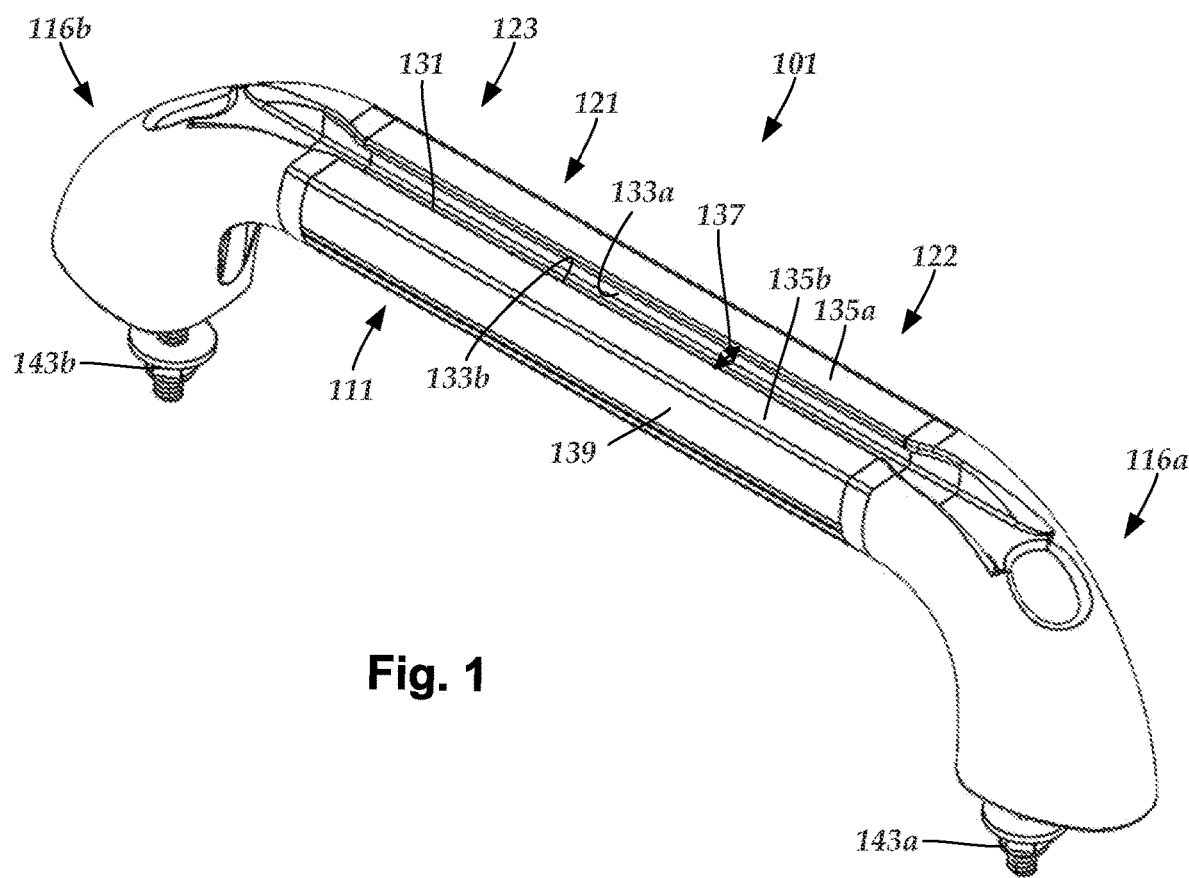
FIG. 1 is a schematic perspective view of one embodiment of a handle with a mounting track suitable for receiving a retention element of a mount assembly, according to the invention.

FIG. 1 illustrates, in a schematic perspective view, one embodiment of a handle 101 that includes a handle section 111 and legs 116a, 116b that are attachable to a surface. In the illustrated embodiment, the handle 101 includes two legs 116a and 116b. Any suitable number of legs can be used to attach the handle to a surface including, for example, one, two, three, four, five, or more legs. In the illustrated embodiment, the legs 116a and 116b are shown disposed along opposing ends of the handle section 111. The leg(s) can be coupled to the handle section at any suitable location(s) along a length of the handle section including one or more of the ends, or an intermediate portion, or a combination of one or more of the ends and an intermediate portion.

A mounting track 121 is formed along at least a portion of the handle section 111. The mounting track 121 has a first end 122, an opposing second end 123, and includes a track base 131 and two vertical track rails 133a, 133b extending opposite each other from the track base 131. Two horizontal track beams 135a, 135b extend from the vertical track rails 133a, 133b, respectively, over the track base 131 towards each other. The horizontal track beams 135a, 135b are laterally spaced apart from each other by a first distance 137. In at least some embodiments, the horizontal track beams 135a, 135b are laterally spaced apart from each other by the first distance 137 along an entire longitudinal length of the mounting track 121. In at least some embodiments, the horizontal track beams 135a, 135b are laterally spaced apart from each other by the first distance 137 along an entire longitudinal length of the handle section 111.

The vertical track rails 133a, 133b and the horizontal track beams 135a, 135b define a track within which a received retention element of a mount assembly can move. In at least some embodiments, the track is open exclusively along the first end 122 to permit insertion of the retention element of the mount assembly into the track. In other embodiments, the track is open along both the first end 122 and the second end 123 to permit insertion of the retention element of the mount assembly into the track from either end. As described below, with reference to FIG. 4, in at least some embodiments the track is closed along at least one end.

In at least some embodiments, the handle section 111 includes a gripping surface 139 that extends beneath the mounting track 121 and couples together the two horizontal track beams 135a, 135b. In at least some embodiments, the gripping surface 139 extends along an entire longitudinal length of the handle section 111. In at least some embodiments, the track base 131, two vertical track rails 133a, 133b, two horizontal beams 135a, 135b, and gripping surface 139 collectively form a continuous path of material along an axis transverse to a longitudinal length of the handle section 111.

The leg(s) may be attachable to a surface in any suitable manner (e.g., one or more fasteners, adhesive, or the like or combinations thereof). In the illustrated embodiment, the legs 116a, 116b are attachable to a surface, at least in part, using surface fasteners 143a, 143b, respectively. Any suitable type of fastener may be used including, for example, screws, bolts, pins, or the like or combinations thereof. When fasteners are used to attach the leg(s) to a surface, any suitable number of fasteners can be used per leg (e.g., one, two, three, four, five, or more fasteners). In the illustrated embodiment, a single surface fastener 143a, 143b is used for attaching each leg 116a, 116b, respectively, to a surface.

In at least some embodiments, the leg(s) are configured to separate the handle section 111 of the handle 101 from a surface to which the leg(s) are attached. In at least some embodiments, the legs extend from the handle in a direction that is approximately orthogonal to a longitudinal length of the handle section 111. When the one or more legs are attached to a surface, the handle section forms a graspable handle. The graspable handle may advantageous. A user can, for example, use the handle to pick-up the object having the surface to which the one or more legs are attached. As another example, a user can, in some instances, use the handle to facilitate climbing up on, or into, the object having the surface to which the one or more legs are attached.

Figure 2A:
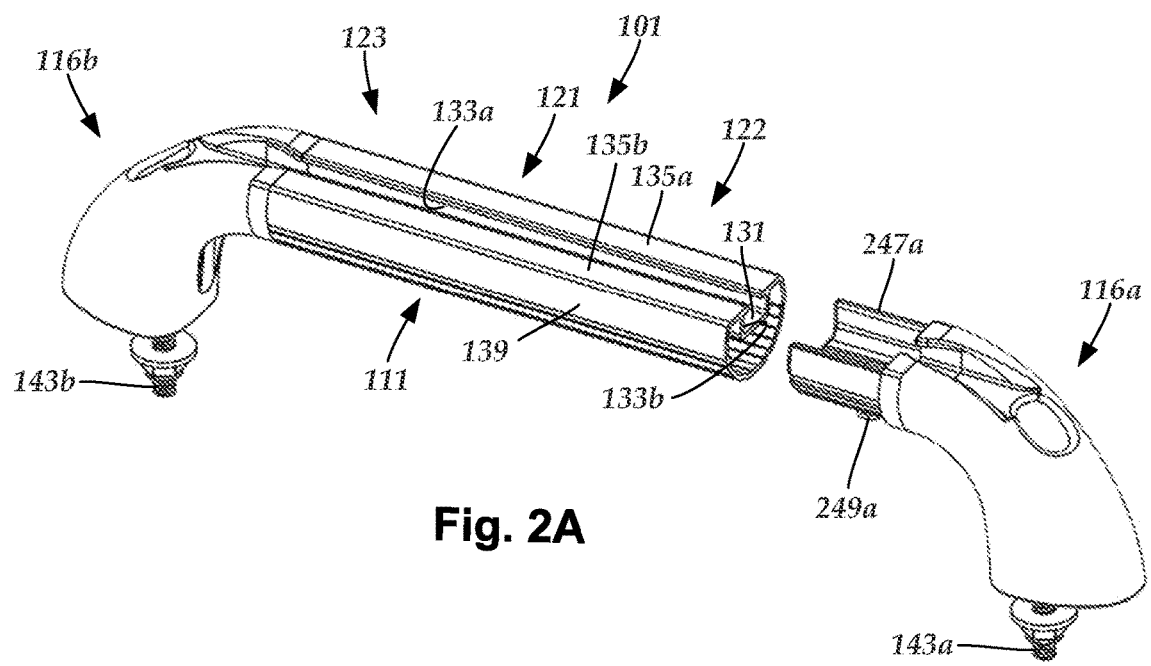
FIG. 2A is a schematic perspective view of one embodiment of the handle of FIG. 1 with a handle section of the handle attached to one leg of the handle and separated from another leg of the handle, according to the invention.
Figure 2B:
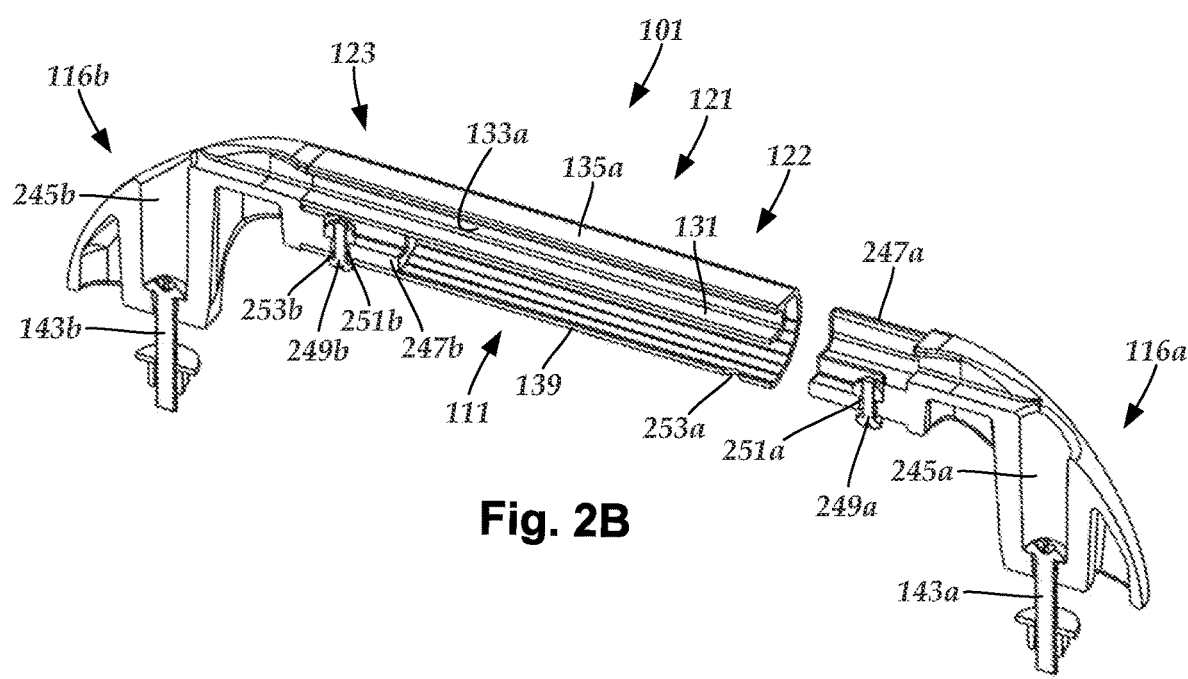
FIG. 2B is a schematic perspective cross-sectional view of one embodiment of the handle of FIG. 2A, according to the invention.
Figure 2C:
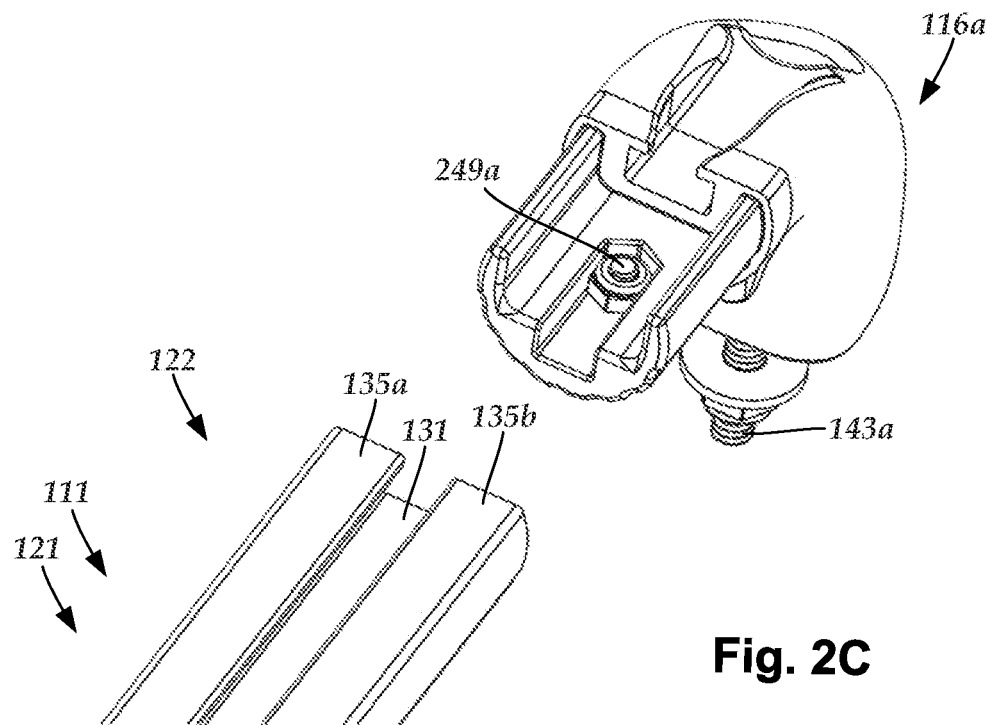
FIG. 2C is a schematic first perspective, close-up view of one embodiment of a portion of the handle of FIG. 2A where the handle section of the handle is separated from one of the legs, according to the invention.
Figure 2D:
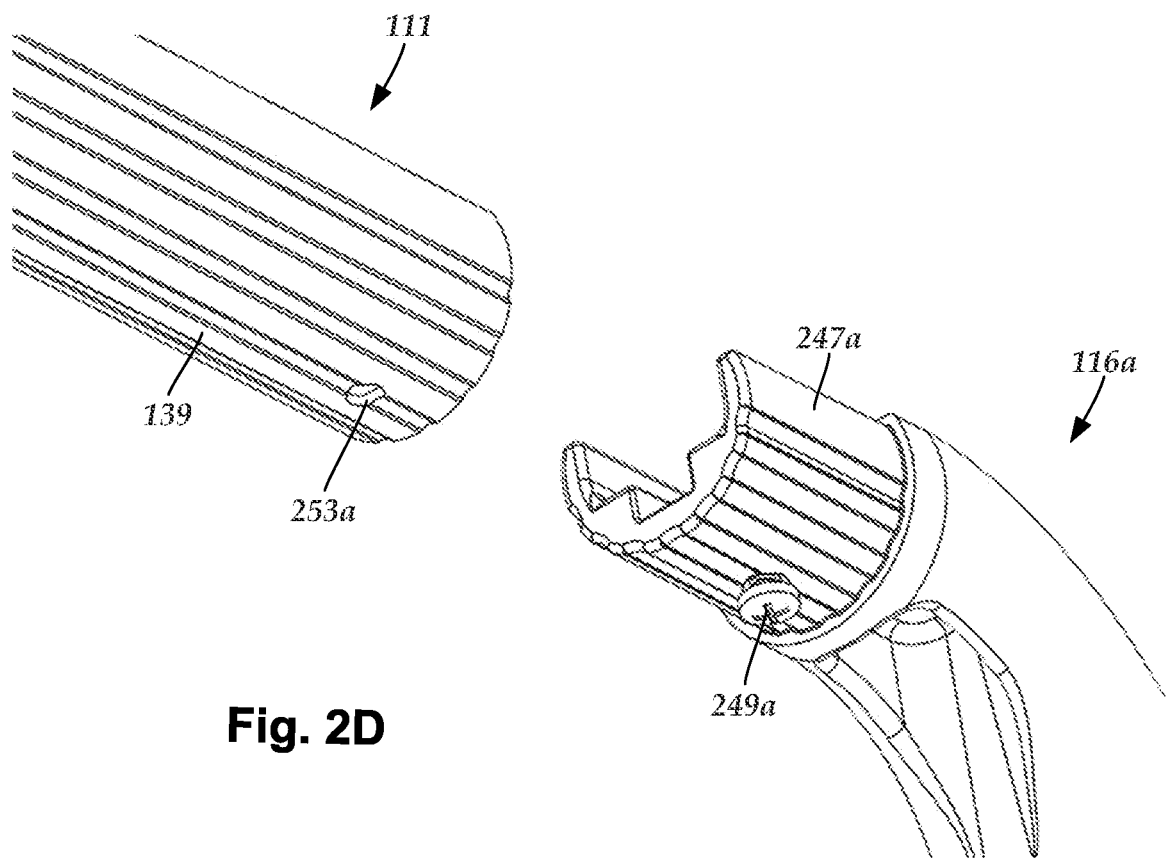
FIG. 2D is a schematic second perspective, close-up view of one embodiment of a portion of the handle of FIG. 2A where the handle section of the handle is separated from one of the legs, according to the invention.

Turning to FIGS. 2A-2D, in at least some embodiments the handle section is detachable from the one or more legs. FIG. 2A illustrates, in a schematic perspective view, one embodiment of the handle 101. FIG. 2B illustrates the handle 101 in schematic perspective cross-sectional view. In FIGS. 2A-2B, the second end 123 of the handle section 111 is coupled to the leg 116b, while the first end 122 of the handle section 111 is separated from the leg 116a. FIGS. 2C and 2D illustrate, in several different perspective views, close-ups of the first end 122 of the handle section 111 separated from the leg 116a. In the embodiment shown in FIGS. 2A-2D, the leg 116a includes an attachment element 247a configured for insertion into the first end 122 of the handle section 111. FIG. 2B also shows the leg 116b having an attachment element 247b inserted into the second end 122 of the handle section 111.

The leg(s) may be attachable to the handle section 111 in any suitable manner (e.g., one or more fasteners, adhesive, interference fit, or the like or combinations thereof). In the embodiments illustrated in FIGS. 2A-2D, the legs 116a, 116b are attachable to the handle section 111, at least in part, using track fasteners 249a, 249b, respectively. In at least some embodiments, the track fasteners extend through track-fastener apertures defined along the attachment elements of the legs, and also along the handle section 139. In the embodiment illustrated in FIG. 2B, the track fasteners 249a, 249b are shown extending through first track-fastener apertures 251a, 251b, respectively, defined along the attachment elements 247a, 247b of the legs 116a, 116b, respectively; and also through second track-fastener apertures 253a, 253b defined along the ends 122, 123 respectively, of the gripping surface 139 of the handle section 111.

Any suitable type of fastener may be used for the track fasteners including, for example, screws, bolts, pins, or the like or combinations thereof. When track fasteners are used to attach the leg(s) to handle section 111, any suitable number of fasteners can be used per leg (e.g., one, two, three, four, five, or more fasteners). In the illustrated embodiment, a single track fastener 249a, 249b is used for attaching each leg 116a, 116b, respectively, to the intermediate surface 111.

FIG. 2B also shows one embodiment of fastening apertures 245a, 245b disposed along legs 116a, 116b, respectively, and configured for receiving surface fasteners 143a, 143b, respectively, for attaching the handle 101 to a surface. In at least some embodiments, the fastening apertures 245a, 245b are coverable by removable, or partially-removable, caps.

Turning to FIGS. 3A-3C, in at least some embodiments the mounting track includes at least one insertion zone that provides a location where a retention element of the mount assembly is insertable into the track. The mounting track can include any suitable number of insertion zones including, for example, one, two, three, or more. In at least some embodiments, the one or more insertion zones are the only locations where the mount assembly can be inserted (or removed) from the mounting track.

In some embodiments, the mounting track 121 is formed entirely along the handle section 111 of the handle. In other embodiments, the mounting track extends onto at least one leg of the handle. In some embodiments, the insertion zone is disposed entirely along the handle section 111 of the handle. In some embodiments, the insertion zone is disposed entirely along a leg of the handle. In some embodiments, the insertion zone is partially disposed along the handle section and partially disposed along a leg.

In at least some embodiments, the insertion zone is positioned at one end of the mounting track. In some embodiments, an insertion zone is positioned at each end of the mounting track. In at least some embodiments, at least one insertion zone is disposed along an intermediate portion of the mounting track in lieu of, or in addition to, the one or more ends of the mounting track. In at least some embodiments, the track includes an insertion zone positioned at one end of the mounting track, while the mounting track is closed at the opposing end by one, or both, of the vertical rails 133a, 133b.

FIG. 3A illustrates, in schematic perspective view, one embodiment of the handle 101 with insertion zones 361a, 361b disposed on legs 116a, 116b, respectively, of the handle 101. As shown in FIG. 3A, the insertion zones 361a, 361b abut the ends 122, 123, respectively, of the handle section 111 and are continuous with the mounting track 121. The insertion zones 361a, 361b are configured for facilitating insertion of a retention element of a mount assembly into the mounting track 121.

FIG. 3B illustrates, in a schematic first perspective view, one embodiment of the insertion zone 361a disposed along the leg 116a. FIG. 3C shows the insertion zone 361a disposed along the leg 116a in a second perspective view. The insertion zone 361a is described below. It will be understood that the insertion zone 361b may include some, or all of the components and features described with respect to insertion zone 361a.

The insertion zone 361a has a first end 365 that abuts the mounting track 121 and an opposing second end 366. The insertion zone 361a includes an insertion-zone base 371 and two vertical insertion-zone rails 373a, 373b extending opposite each other from the insertion-zone base 371. In at least some embodiments, the vertical insertion-zone rails 373a, 373b taper as they extend away from the first end 365 of the insertion zone 361a towards the second end 366. Two horizontal insertion-zone beams 375a, 375b extend from the vertical insertion-zone rails 373a, 373b, respectively, over the insertion-zone base 371 towards each other. In at least some embodiments, the horizontal insertion-zone beams 375a, 375b taper as they extend away from the first end 365 of the insertion zone 361a towards the second end 366.

Portions of the horizontal insertion-zone beams 375a, 375b in proximity to the first end 365 of the insertion zone 361a are laterally spaced apart from each other by the first distance 137. As shown in FIGS. 3A-3C, the insertion zone 361a tapers from the second end 366 towards the first end 365 such that portions of the two horizontal insertion-piece beams 375a, 375b are spaced apart from each other by a second distance 367 (that, as shown in FIG. 3A, is larger than the first distance 137) at the second end 366 to facilitate insertion of a retention element of the mount assembly into the track. In at least some embodiments, the second distance 367 is at least 5%, 10%, 15%, 20%, 25%, 30%, 40%, 50%, 100%, 200%, 300%, 400%, or 500% larger than the first distance 137.

As illustrated in FIGS. 3A-3C, when the leg 116a is attached to the handle section 111, the insertion-zone base 371, vertical insertion-zone rails 373a, 373b, and horizontal insertion-zone beams 375a, 375b align with the corresponding portions of the mounting track 121 to form at least a track within which a received retention element of a mount assembly can be moved.

Figure 4:
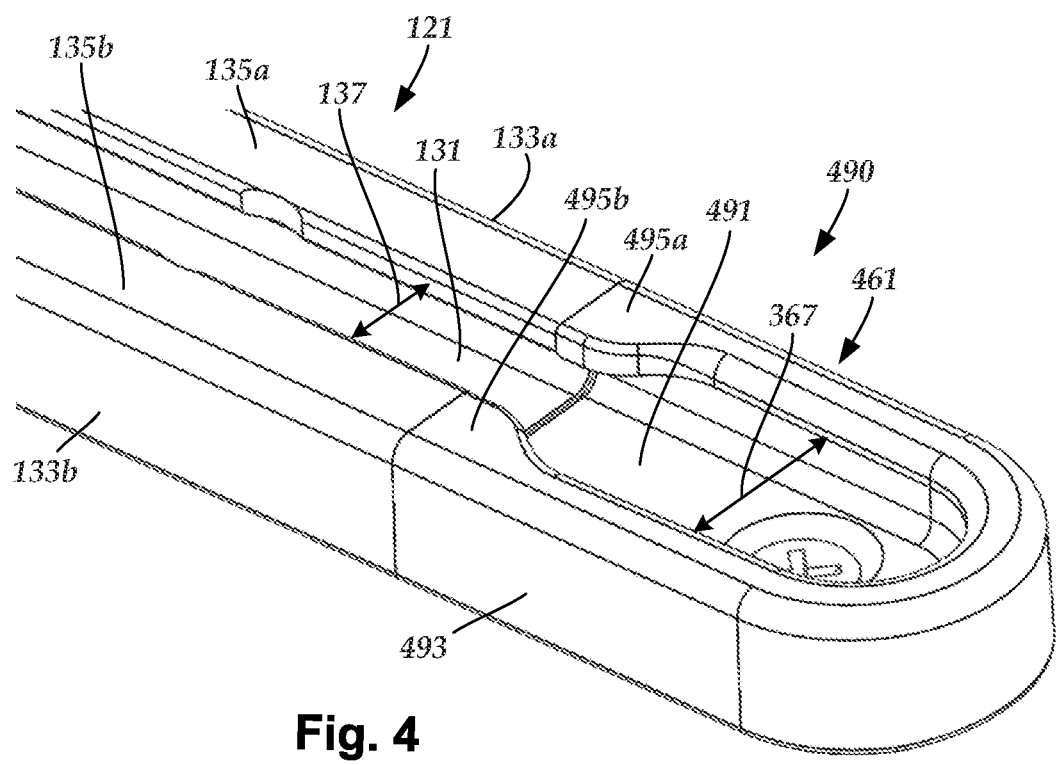
FIG. 4 is a schematic perspective view of one embodiment of a portion of an endpiece coupled to a mounting track and forming a closed end, the endpiece including an insertion zone along which a retention element of a mount assembly can be inserted into the track, according to the invention.

Turning to FIG. 4, in yet other embodiments the mounting track includes at least one insertion zone disposed along an endpiece that forms a closed end of the track. The one or more endpieces are each positioned along an end of the track and each include a closed end. In at least some embodiments, at least one endpiece is disposed along a leg of the handle. In at least some embodiments, at least one endpiece is disposed along the handle section of the handle. In some embodiments, a different endpiece is disposed along each end of the track. In other embodiments, a single endpiece is disposed along one end of the track, while the other end of the track is closed (without an insertion zone). In yet other embodiments, a single endpiece is disposed along one end of the track, while the other end of the track is open, either with or without an insertion zone.

FIG. 4 illustrates, in schematic perspective view, one embodiment of a portion of an endpiece 490 coupled to one end of the mounting track 121. The endpiece 490 includes an insertion zone 461 along which a retention element of a mount assembly can be inserted into the track.

The endpiece 490 includes an endpiece base 491 and a vertical endpiece rail 493 extending from the endpiece base 491 and forming a perimeter around a portion of the endpiece base 491. Two horizontal endpiece beams 495a, 495b extend from the vertical endpiece rail 493 over the endpiece base 491 towards each other.

As illustrated in FIG. 4, when the endpiece 490 is coupled to the mounting track 121, the track base 131 and the endpiece base 491 align; the vertical track rails 133a, 133b and the vertical endpiece rail 493 align; and the horizontal track beams 135a, 135b and the horizontal endpiece beams 495a, 495b, respectively, align to form continuous track within which a retention element of a mount assembly can be moved.

The continuous track is closed at one end by at least the vertical endpiece rail 493. The endpiece 490 includes the insertion zone 461 where at least two opposing portions of the two horizontal endpiece beams 495a, 495b are spaced apart from each other by the second distance 367 to facilitate insertion of a retention element of the mount assembly into the track.

Figure 5A:
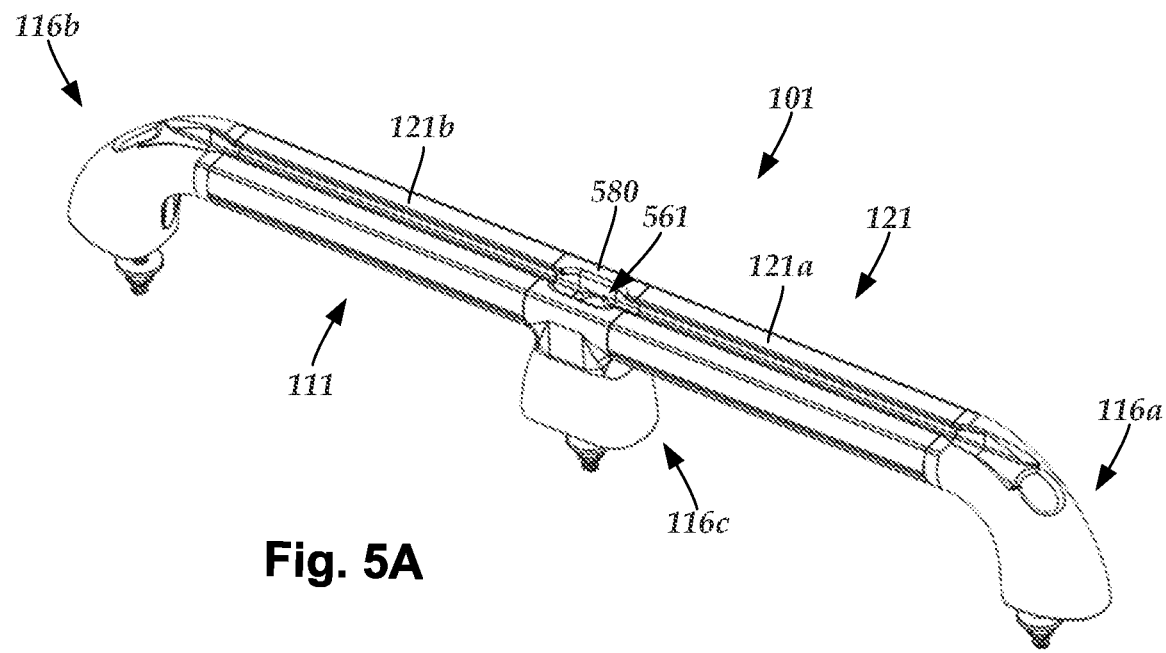
FIG. 5A is a schematic perspective view of one embodiment of an insertion-piece disposed along the handle-section of the handle of FIG. 1, the insertion-piece disposed between two sections of the mounting track, according to the invention.
Figure 5B:
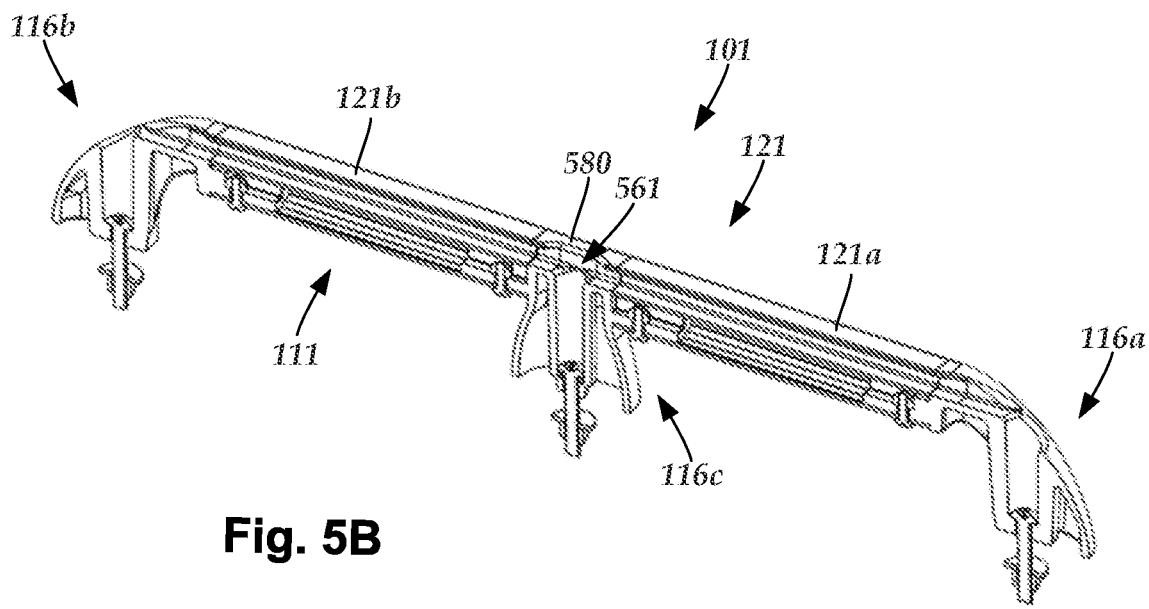
FIG. 5B is a schematic perspective cross-sectional view of one embodiment of the handle of FIG. 5A, according to the invention.
Figure 6:
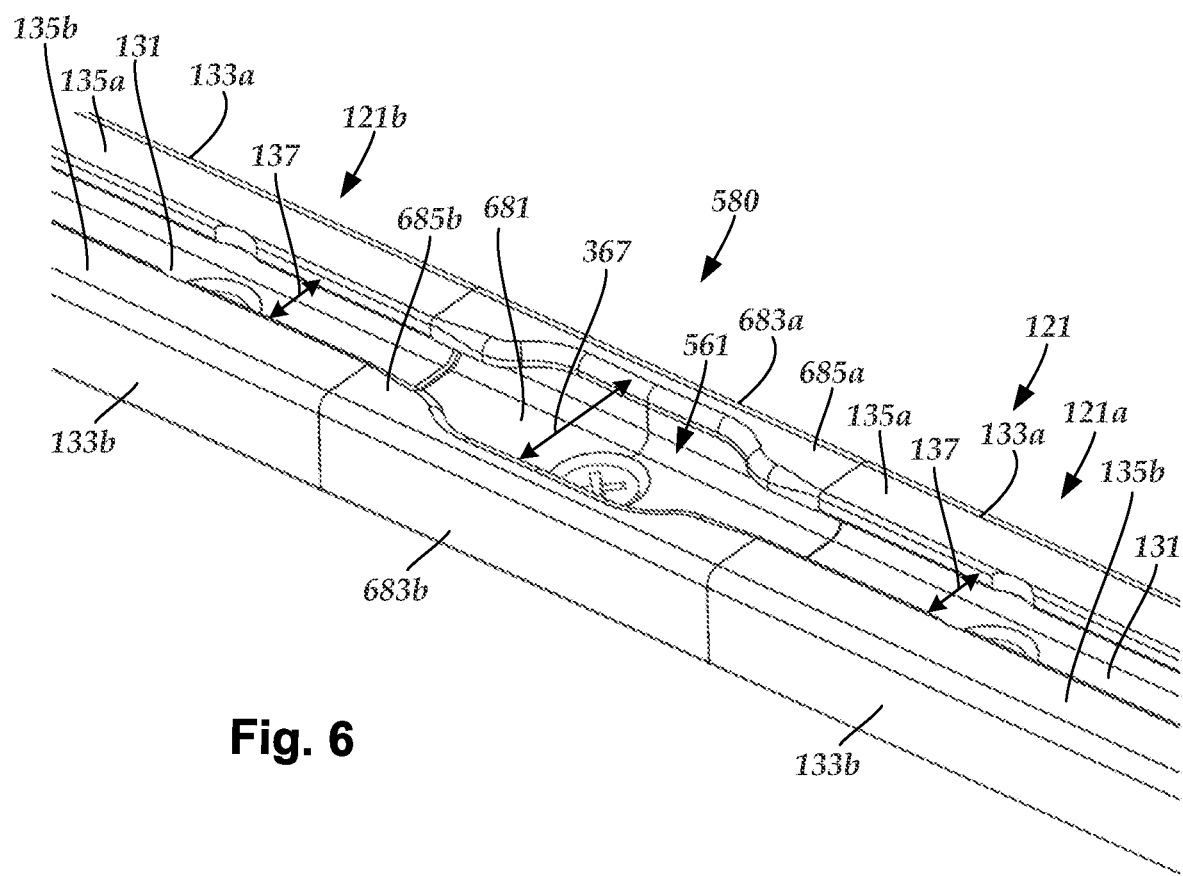
FIG. 6 is a schematic perspective view of one embodiment of a portion of an insertion-piece coupled to a mounting track, the insertion-piece including an insertion zone along which a retention element of a mount assembly can be inserted into the track, according to the invention.

Turning to FIGS. 5A-6, in at least some embodiments, the handle section includes at least one insertion-piece disposed along an intermediate portion of the track. The insertion-piece includes an insertion zone suitable for receiving a retention element of a mount assembly. In some embodiments, the one or more insertion-pieces are the only locations along the track where a retention element of a mount assembly is insertable into the track. In other embodiments, the track includes at least one other insertion zone in addition to the insertion zone(s) of the one or more insertion-pieces. In at least some embodiments, a leg is coupled to the insertion-piece.

FIG. 5A illustrates, in schematic perspective view, one embodiment of an insertion-piece 580 disposed along the handle-section 111 of the handle 101. FIG. 5B illustrates the insertion-piece 580 disposed along the handle-section 111 of the handle 101 in schematic perspective cross-sectional view. The insertion-piece 580 includes an insertion zone 561 and is disposed between two sections 121a, 121b of the mounting track 121.

In at least some embodiments, a leg 116c is coupled to the insertion-piece 580. In at least some embodiments, the leg 116c is configured for attaching the handle 101 to a surface. In the illustrated embodiment, the handle 101 includes three legs, 116a, 116b, 116c, where the legs 116a, 116b are disposed along opposing ends of the handle 101 and the leg 116c is coupled to the insertion-piece 580. Any suitable number of legs can be used to attach the handle to a surface. The leg(s) can be coupled to the handle section at any suitable location(s) along a length of the handle section including one or more of the ends, or an intermediate portion, or a combination of one or more of the ends and an intermediate portion. In at least some embodiments, the handle 101 includes the leg 116c without either (or both) of the legs 116a, 116b.

FIG. 6 illustrates, in schematic perspective view, one embodiment of a portion of the insertion-piece 580 coupled to an intermediate portion of the mounting track 121. In the illustrated embodiments, the insertion-piece 580 is disposed between sections 121a and 121b of the mounting track 121. The insertion-piece 580 includes the insertion zone 561 along which a retention element of a mount assembly can be inserted into the track.

The insertion-piece 580 includes an insertion-piece base 681 and two vertical insertion-piece rails 683a, 683b extending from the insertion-piece base 681 and forming edges of the insertion-piece base 681. Two horizontal insertion-piece beams 685a, 685b extend from the opposing vertical insertion-piece rails 683a, 683b over the insertion-piece base 681 towards each other.

As illustrated in FIG. 6, when the insertion-piece 680 is coupled to the mounting track 121, the track bases 131 and the insertion-piece base 681 align; the vertical track rails 133a, 133b and the vertical insertion-piece rails 683a, 683b align;

and the horizontal track beams 135a, 135b and the horizontal insertion-piece beams 685a, 685b, respectively, align to form continuous track within which a retention element of a mount assembly can be moved. The insertion-piece 680 includes the insertion zone 681 where at least two opposing portions of the two horizontal endpiece beams 685a, 685b are spaced apart from each other by the second distance 367 to facilitate insertion of a retention element of the mount assembly into the track.

Turning to FIGS. 7A-9B, the mounting track can be used to receive a retention element of a mounting assembly. Any suitable retention element can be used. In at least some embodiments, the retention element includes a flange configured for being slidably-retained beneath opposing horizontal beams of the continuous track, while one or more elongated members of the retention element that are coupled to the flange extend outward from the continuous track to a position over the mounting track and couple with a mount. In at least some embodiments, the flange and the elongated member are a unitary structure, such as a T-bolt or a T-nut. In at least some embodiments, the elongated member is threaded.

Any suitable type of mount may be used. The choice of different mounts may, in some instances, be determined based, at least in part, on the particular functionality desired. In at least some embodiments, mounts can be removed from the elongated member and swapped out for other mounts, as desired.

Figure 7A:
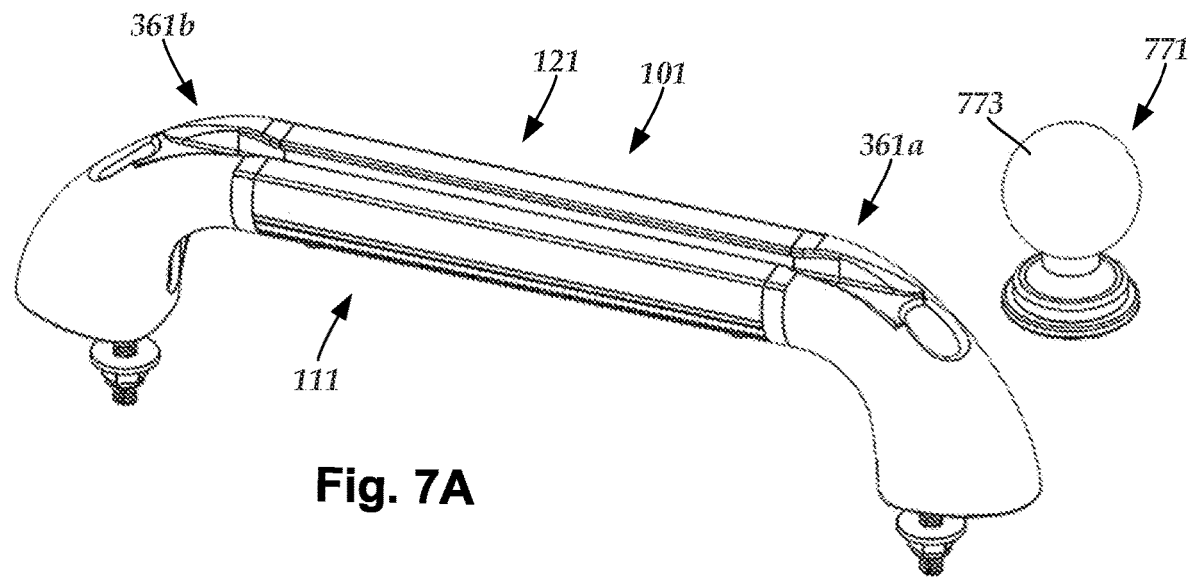
FIG. 7A is a schematic first perspective view of one embodiment of the handle of FIG. 1 and a mount assembly suitable for insertion into the mounting track of the handle, according to the invention.
Figure 7B:
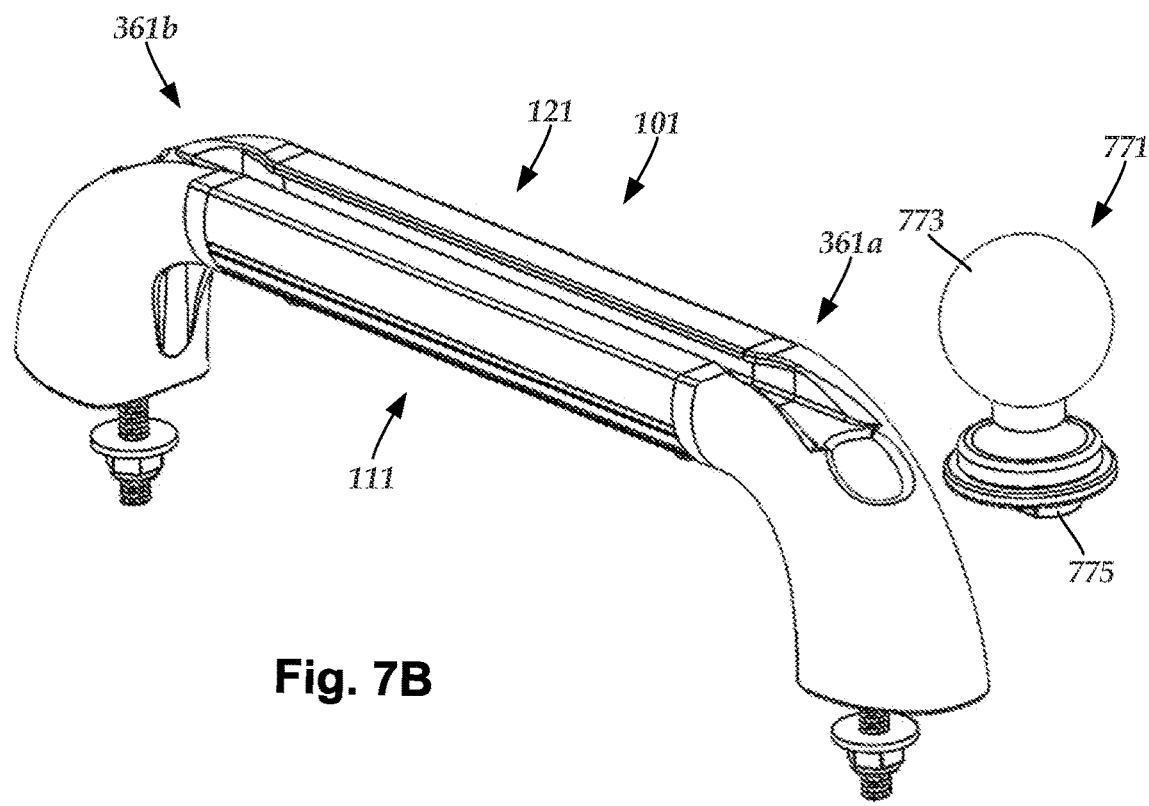
FIG. 7B is a schematic second perspective view of one embodiment of the handle and mount assembly of FIG. 7A, according to the invention.
Figure 7C:
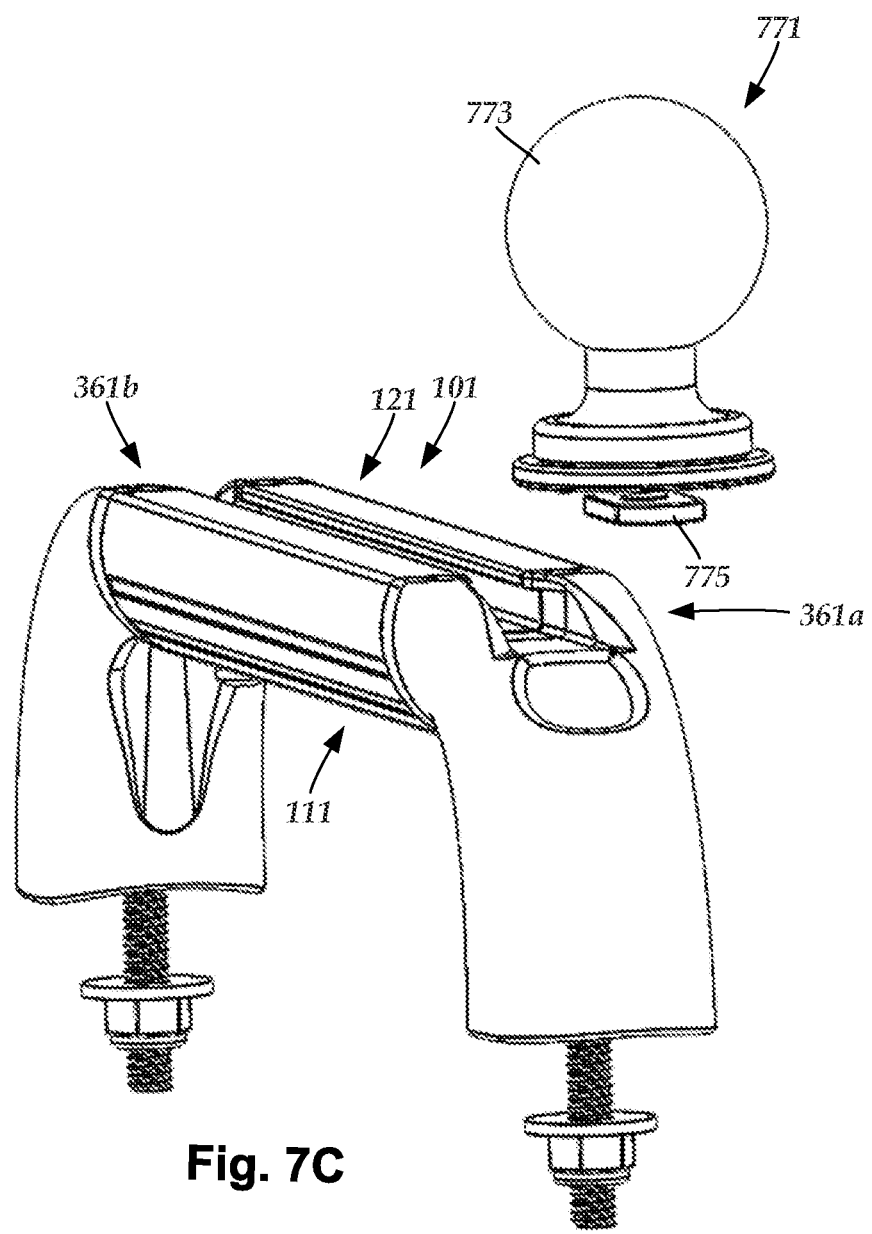
FIG. 7C is a schematic third perspective view of one embodiment of the handle and mount assembly of FIG. 7A, according to the invention.

In FIGS. 7A-8B, a mounting track is configured for receiving a mount assembly that includes a ball mount. FIGS. 7A-7C show, in a schematic perspective views, a mount assembly 771 that includes a ball mount 773 coupled to a retention element 775 and. The mount assembly can, optionally, include multiple retention elements. The mounting assembly 771 is shown disposed in proximity to the insertion zone 361a.

The retention element 775 can, optionally, be an elongated member attached to a flange. In the illustrated embodiments, the retention element 775 is a T-bolt. In at least some embodiments, the retention element 775 includes a flange having a smallest lateral dimension that is greater than the first distance (see e.g., 137 in FIG. 1) and at least one lateral dimension that is less than the second distance (see e.g., 367 in FIGS. 3A-3C), thereby enabling the retention element 775 to be inserted into an insertion zone (e.g., insertion zone 361a or 361b) and retained by the mounting track.

Figure 7D:
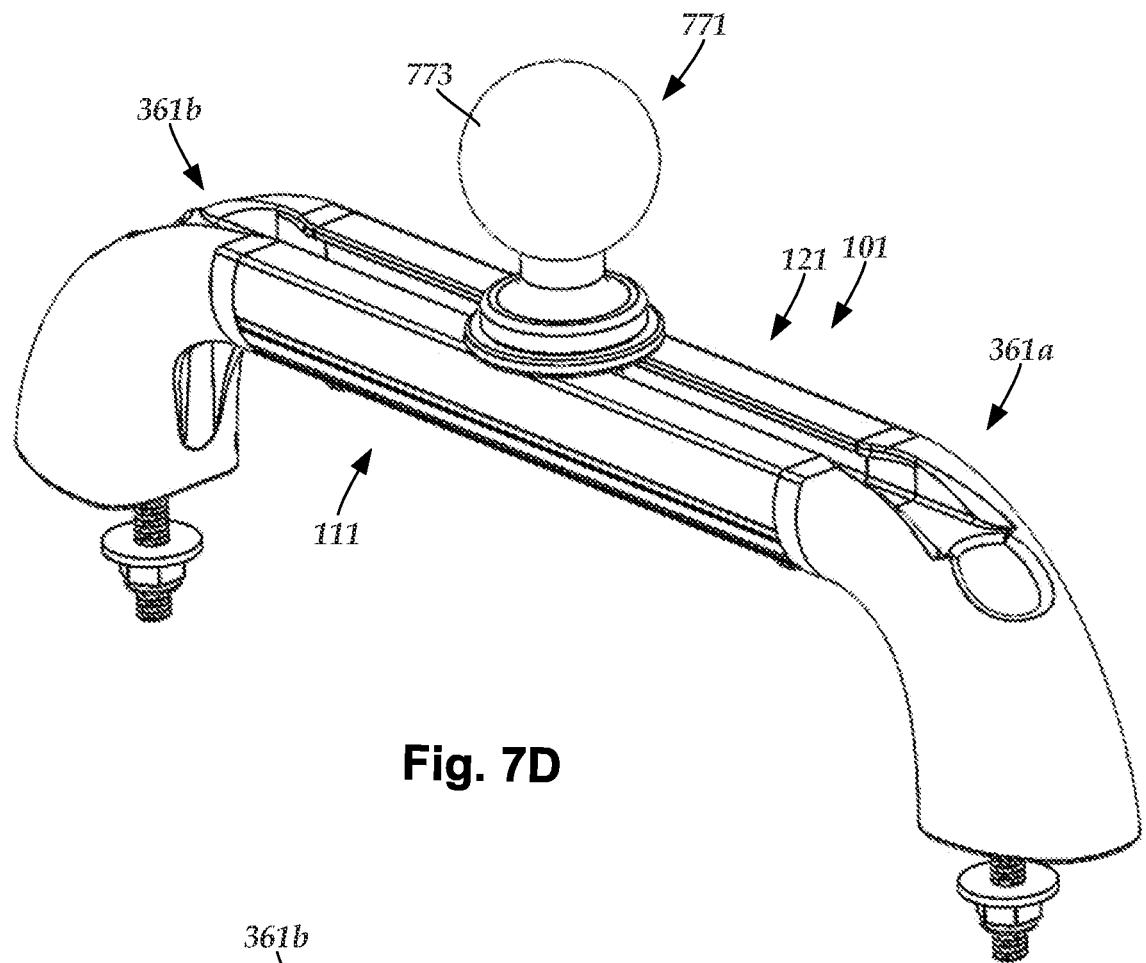
FIG. 7D is a schematic perspective view of one embodiment of the mount assembly of FIGS. 7A-7C inserted into the mounting track of the handle of FIGS. 7A-7C, according to the invention.
Figure 7E:
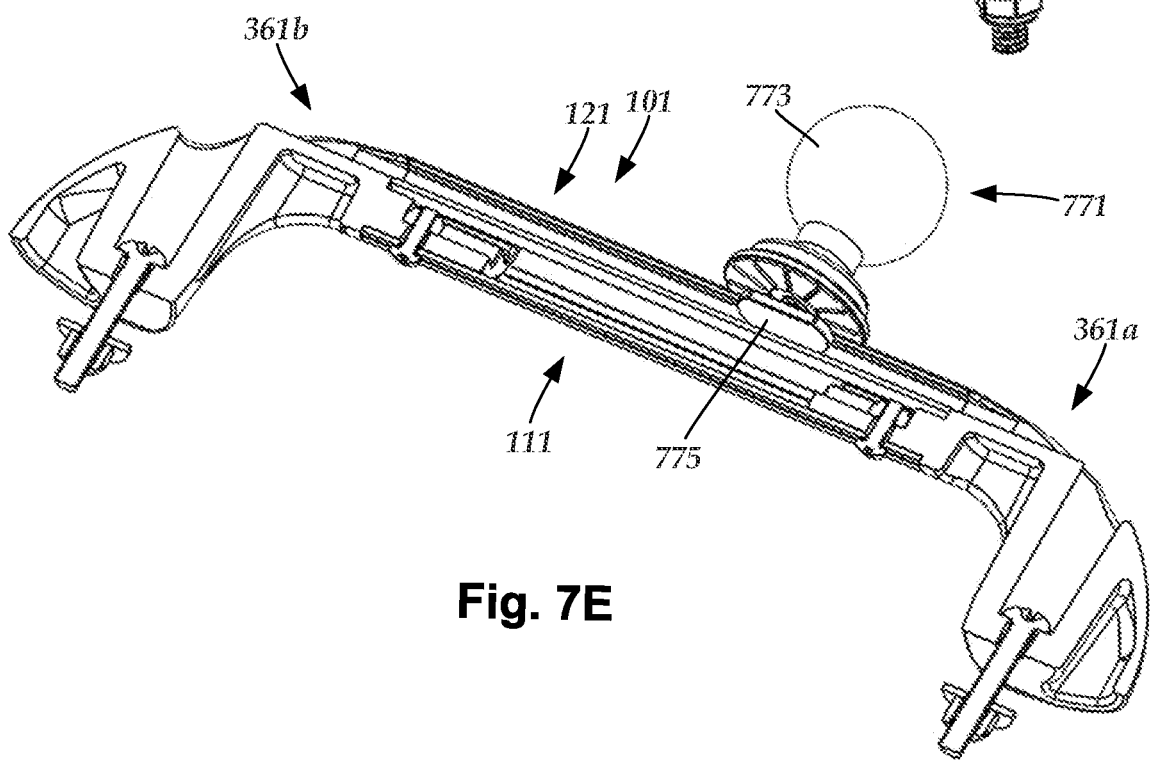
FIG. 7E is a schematic perspective view of one embodiment of the handle and mount assembly of FIG. 7D, according to the invention.

FIG. 7D illustrates, in a schematic perspective view, one embodiment of the mount assembly 771 retained along the mounting track 121 of the handle 101. FIG. 7E shows the mount assembly 771 retained along the mounting track 121 of the handle 101 in a schematic perspective, longitudinal-cross-sectional view. In at least some embodiments, the mounting assembly 771 is insertable into the mounting track 121 along either insertion zone 361a or 361b. In at least some embodiments, the mounting assembly 771 is removable from the mounting track 121 from either insertion zone 361a or 361b. In at least some embodiments, the mounting track 121 includes a single insertion zone along one end and is closed along the opposing end.

Figure 8A:
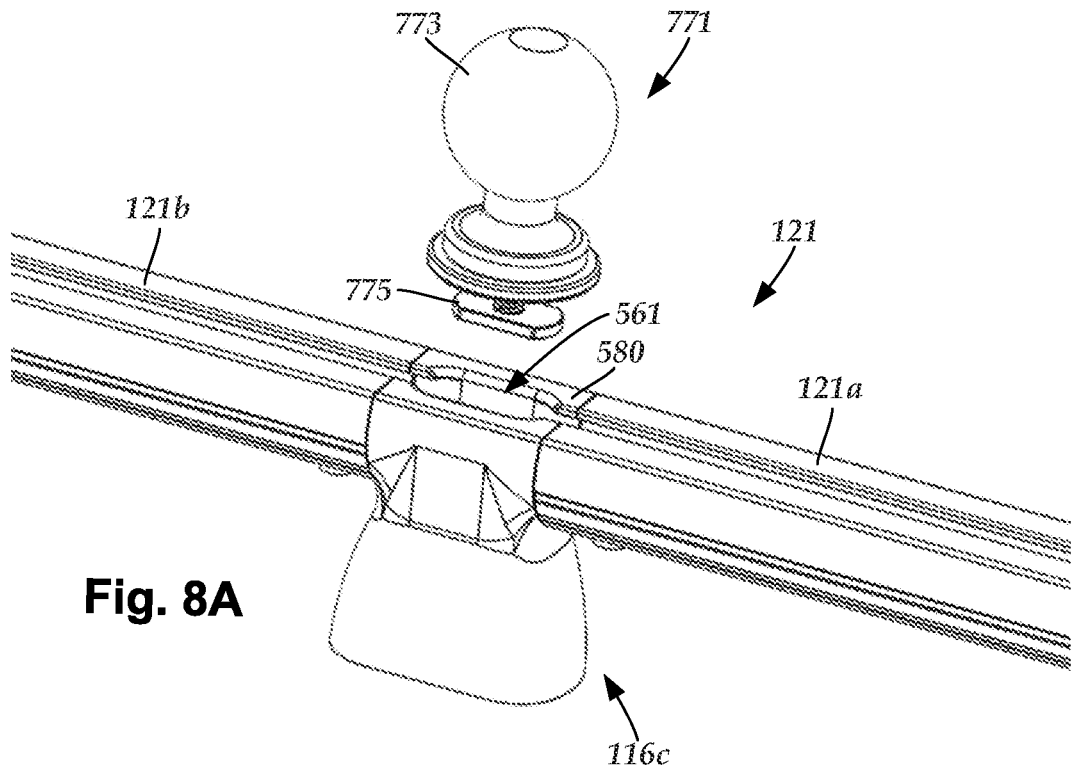
FIG. 8A is a schematic perspective view of one embodiment of the handle of FIG. 5A and mount assembly of FIG. 7A, the mount assembly suitable for insertion into the insertion-piece of the handle, according to the invention.
Figure 8B:
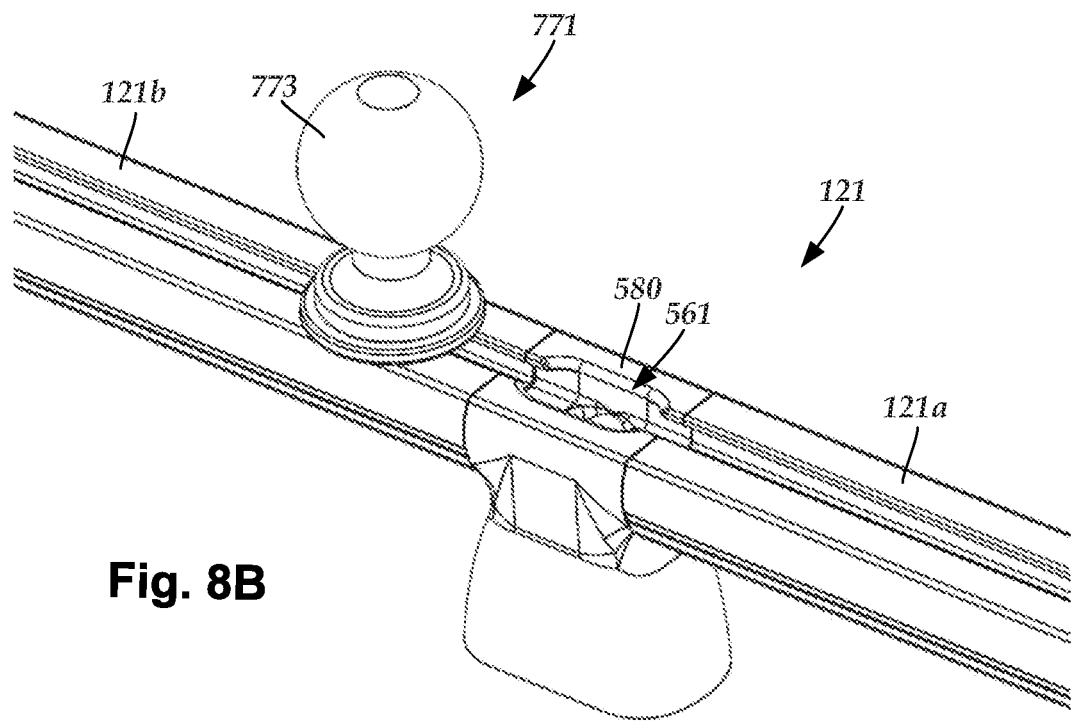
FIG. 8B is a schematic perspective view of one embodiment of the mount assembly of FIG. 8A received by the handle of FIG. 8A, according to the invention.

FIG. 8A illustrates, in schematic perspective view, one embodiment of the mount assembly 771 disposed in proximity to the insertion zone 561 of the insertion-piece 580. FIG. 8B illustrates, in schematic perspective view, one embodiment of the mount assembly 771 inserted into the insertion-piece 580 and moved along the mounting track 121. In the illustrated embodiment, the mount assembly 771 is shown moved along the section 121b of the mounting track 121. It will be understood that the mount assembly 771 can also be moved along the section 121a of the mounting track 121.

Figure 9A:
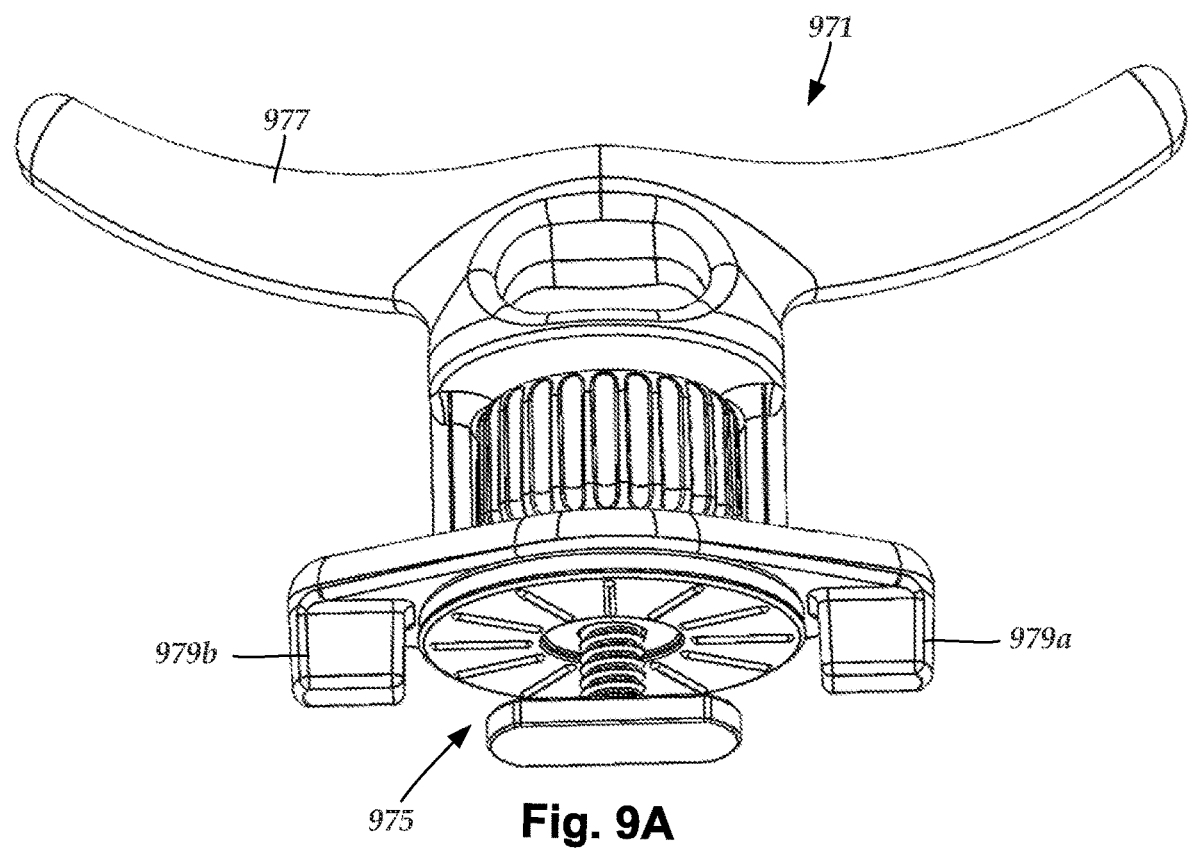
FIG. 9A is a schematic perspective view of another embodiment of a mount assembly suitable for being received by a mounting track, according to the invention.
Figure 9B:
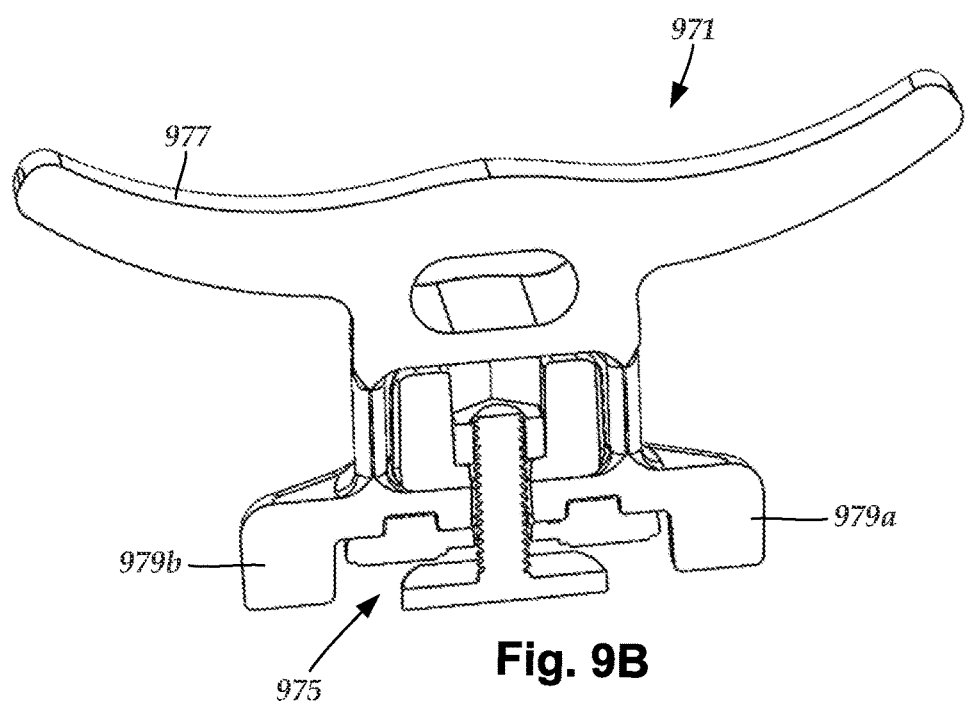
FIG. 9B is a schematic perspective cross-sectional view of one embodiment of the mount assembly of FIG. 9A, according to the invention.

In at least some embodiments, the mounting assembly includes a cleat. FIG. 9A shows, in schematic perspective view, one embodiment of a mount assembly 971 suitable for being received by a mounting track. FIG. 9B shows, in schematic cross-sectional perspective view, one embodiment of the mount assembly 971. As shown in FIGS. 9A-9B, the mount assembly 971 includes a mount that is formed as a cleat 977 and is attached to a retention element 975. In some embodiments, the cleat 977 includes one or more optional guide features 979a, 979b for facilitating the maintaining of a particular orientation of the cleat 973 relative to the mounting track 121. In at least some embodiments, the guide features 979a, 979b are insertable into the mounting track for facilitating the maintaining of a particular orientation of the cleat 977.

In at least some embodiments, the mount assembly (e.g., the ball or the cleat) includes a retention mechanism for enabling the mount assembly to removably maintain a particular location, such as a mounting location, along a length of the mounting track. For example, a user may be able to rotate the mount (or a dial or knob disposed on the mount), or flip a lever attached to the mount, or the like, thereby reversibly actuating the retention mechanism to tighten against a portion of the mounting track to maintain the positioning of the mount assembly relative to the mounting track. In at least some embodiments, the mount can be tightened against the track using the retention element. For example, the mount may define a threaded bore that receives a threaded portion of the elongated member, thereby enabling the mount to be rotated relative to the retention element to tighten the mount against the track.

In at least some embodiments, the mounting track concurrently receives multiple mounting assemblies. When the mounting track concurrently receives multiple mounting assemblies, the individual mounting assemblies can be exclusively one type of mount (e.g., ball or cleat), or can include both types of mounts (e.g., ball and cleat). Other types of mounts are attachable to retention elements in addition to, or in lieu of, either balls or cleats.

The above specification provides a description of the manufacture and use of the invention. Since many embodiments of the invention can be made without departing from the spirit and scope of the invention, the invention also resides in the claims hereinafter appended.

The invention claimed is:

1. A handle with a mounting track for supporting a mount assembly, comprising:
    a handle section, wherein the handle section forms a graspable handle;
    at least one leg detachably coupled to, and extending away from, the handle section; and
    a mounting track disposed within the handle section, the mounting track comprising a base, two horizontal beams, and two vertical rails extending opposite each other from the base to the horizontal beams, wherein each of the horizontal beams extends from a different one of the vertical rails over the base toward the other horizontal beam, wherein the horizontal beams are laterally spaced apart from each other by a first distance, wherein the vertical rails and the horizontal beams define a track within which a retention element of the mount assembly can move, wherein, the base of the mounting track is positioned between i) the two horizontal beams and ii) the at least one leg when the at least one leg is coupled to the handle section.

2. The handle of claim 1, wherein the at least one leg comprises two legs that are each detachably coupled to the handle section.

3. The handle of claim 2, wherein the handle section is graspable between the two legs when the two legs are coupled to the handle section.

4. The handle of claim 1, wherein each of the at least one leg is attachable to a surface.

5. The handle of claim 1, further comprising at least one track fastener, each of the at least one track fastener configured for coupling a one of the at least one leg to the handle section.

6. The handle of claim 5, wherein the handle section and the at least one leg each define a track-fastener aperture for insertion of a one of the at least one track fastener to couple the one of the at least one leg to the handle section.

7. The handle of claim 1, wherein at least one of two opposing ends of the mounting track is open to permit insertion of the retention element of the mount assembly into the mounting track.

8. The handle of claim 1, wherein each of two opposing ends of the mounting track is closed.

9. The handle of claim 1, wherein the handle section has a first end and an opposing second end, and wherein the at least one leg comprises a first leg coupled to the first end of the handle section and a second leg coupled to the second end of the handle section.

10. The handle of claim 9, further comprising a third leg coupled to the handle section.

11. The handle of claim 9, wherein the mounting track is open at each of the first end, over the first leg, and the second end, over the second leg, to permit insertion of the retention element of the mount assembly into the mounting track.

12. The handle of claim 1, further comprising an insertion zone for facilitating insertion of the retention element of the mount assembly into the mounting track, the insertion zone comprising
    an insertion-zone base having a first end and an opposing second end, wherein at least one of the first end or the second end of the insertion-zone base couples to the mounting track;
    two vertical insertion-zone rails extending opposite each other from the insertion-zone base; and
    two horizontal insertion-zone beams, wherein each of the horizontal insertion-zone beams extends from a different one of the vertical insertion-zone rails over the insertion-zone base toward the other horizontal insertion-zone beam;
    wherein at least two opposing portions of the two horizontal insertion-zone beams are spaced apart from each other by a second distance that is at least 10% larger than the first distance to facilitate insertion of the retention element of the mount assembly into the mounting track.

13. The handle of claim 1, wherein the mounting track extends over at least a portion of each of the at least one leg.

14. A track-mounting system, comprising
    the handle of claim 1; and
    a mount assembly coupleable to the mounting track of the handle, the mount assembly comprising a retention element and a mount coupled to the retention element configured for insertion into the mounting track.

15. The track-mounting system of claim 14, wherein the retention element is one of a T-bolt or a T-nut.

16. The track-mounting system of claim 14, wherein the mount is a ball mount.

17. The track-mounting system of claim 14, wherein the mount is a cleat.

18. A method of coupling a mount assembly to a handle, the method comprising:
    providing the handle of claim 1;
    inserting a retention element of a mount assembly into the mounting track of the handle; and
    sliding the mount assembly along the mounting track to a mounting location.

19. The method of claim 18, wherein inserting a retention element of a mount assembly into the mounting track comprises inserting the retention element into an insertion zone.

20. The method of claim 18, further comprising fastening the at least one leg of the handle to a surface.

* * * * *